(12) United States Patent
Balraj

(10) Patent No.: US 9,071,318 B2
(45) Date of Patent: Jun. 30, 2015

(54) TECHNIQUES FOR DETERMINING COVARIANCE MEASURES BASED ON CORRELATION CRITERIA

(71) Applicant: Intel IP Corporation, Santa Clara, CA (US)

(72) Inventor: Rajarajan Balraj, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/026,379

(22) Filed: Sep. 13, 2013

(65) Prior Publication Data

US 2015/0078428 A1    Mar. 19, 2015

(51) Int. Cl.
| H04B 1/10 | (2006.01) |
| H04L 25/03 | (2006.01) |
| H04L 25/02 | (2006.01) |
| H04B 7/08 | (2006.01) |

(52) U.S. Cl.
CPC ........ *H04B 1/1081* (2013.01); *H04L 25/03025* (2013.01); *H04L 25/021* (2013.01); *H04B 7/0894* (2013.01); *H04B 7/0891* (2013.01); *H04B 7/0897* (2013.01)

(58) Field of Classification Search
CPC ...... H04B 7/04; H04B 7/0408; H04B 7/0413; H04B 7/0426; H04B 7/043; H04B 7/0452; H04B 7/0491; H04B 7/0891; H04B 7/0894; H04B 7/0897; H04B 2001/709; H04B 2001/7093; H04B 2001/70935; H04B 2001/7103; H04B 2201/709727; H04B 2201/70979; H04B 1/1081; H04L 25/021; H04L 25/03025

USPC ........ 375/142, 143, 144, 148, 150, 152, 267, 375/346, 347, 349, 350
See application file for complete search history.

(56) References Cited

U.S. PATENT DOCUMENTS

| 6,920,192 | B1 * | 7/2005 | Laroia et al. .................. 375/347 |
| 7,012,978 | B2 * | 3/2006 | Talwar ........................ 375/346 |
| 8,483,260 | B2 * | 7/2013 | Rosenqvist ................... 375/148 |
| 2007/0110200 | A1 * | 5/2007 | Mergen et al. ................ 375/350 |
| 2009/0023437 | A1 * | 1/2009 | Cairns et al. ............... 455/422.1 |
| 2009/0220032 | A1 * | 9/2009 | Rosenqvist ................... 375/340 |
| 2009/0238246 | A1 | 9/2009 | David et al. |

(Continued)

OTHER PUBLICATIONS

Astely, D., et al., "Uplink Spatio-Temporal Interference Rejection Combining WCDMA", Wireless Communications, 2001, (SPCWC '01), 2001 IEEE Third Workshop on Signal Processing Advances.

(Continued)

*Primary Examiner* — Young T Tse
(74) *Attorney, Agent, or Firm* — Schiff Hardin LLP

(57) ABSTRACT

A method includes providing a plurality of sets of equalizer taps, wherein each set is coupled to a respective one of a plurality of antenna ports; assigning a first plurality of equalizer taps of the sets of equalizer taps to a first subset; determining a first covariance measure associated with the first plurality of equalizer taps of the first subset based on a first correlation criterion; assigning a second plurality of equalizer taps of the sets of equalizer taps to a second subset; and determining a second covariance measure associated with the second plurality of equalizer taps of the second subset based on a second correlation criterion.

25 Claims, 11 Drawing Sheets

(56) References Cited

U.S. PATENT DOCUMENTS

2010/0027590 A1* 2/2010 Alebachew et al. ......... 375/148
2010/0260237 A1* 10/2010 Jonsson ....................... 375/148
2012/0147995 A1 6/2012 David et al.
2014/0160949 A1* 6/2014 Clausen et al. ............... 370/252

OTHER PUBLICATIONS

Cairns, D., et al., "Robust and Efficient Paramedic Linear Equilization", IEEE Journal, 2009.
Bottomley, G., et al., "A Generalized RAKE Receiver for Interference Suppression", Selected Areas in Communications, IEEE Journal, 2000.

* cited by examiner $$R_e \approx \begin{pmatrix} R_{e,11} & \cdots & R_{e,1N} & 0 & \cdots & 0 \\ \vdots & \ddots & \vdots & \vdots & \ddots & \vdots \\ R_{e,N1} & \cdots & R_{e,NN} & 0 & \cdots & 0 \\ 0 & \cdots & 0 & R_{e,N+1N+1} & \ddots & \vdots \\ \vdots & \ddots & \vdots & \ddots & \ddots & 0 \\ 0 & \cdots & 0 & \cdots & 0 & R_{e,KK} \end{pmatrix}$$

Fig. 3

TECHNIQUES FOR DETERMINING COVARIANCE MEASURES BASED ON CORRELATION CRITERIA

TECHNICAL FIELD

The present disclosure described herein generally relates to techniques for determining covariance measures based on correlation criteria. In particular, the aspects of the present disclosure may relate to methods and devices for determining a first covariance measure associated with first equalizer taps based on a first correlation criterion and a second covariance measure associated with second equalizer taps based on a second correlation criterion.

BACKGROUND

Wireless communication networks may include multiple base stations and multiple mobile stations or User Equipments (UEs). Signals transmitted between components of a wireless communication network may include interference. Methods and devices employed in wireless communication networks constantly have to be improved. In particular, it may be desirable to mitigate interference occurring in wireless communication networks.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

FIG. 3 is a schematic diagram of an exemplary covariance measure 300 of noise and interference in the form of a matrix of dimension (M×K)×(M×K). More details regarding FIG. 3 are described below.

DESCRIPTION

Figure 1:
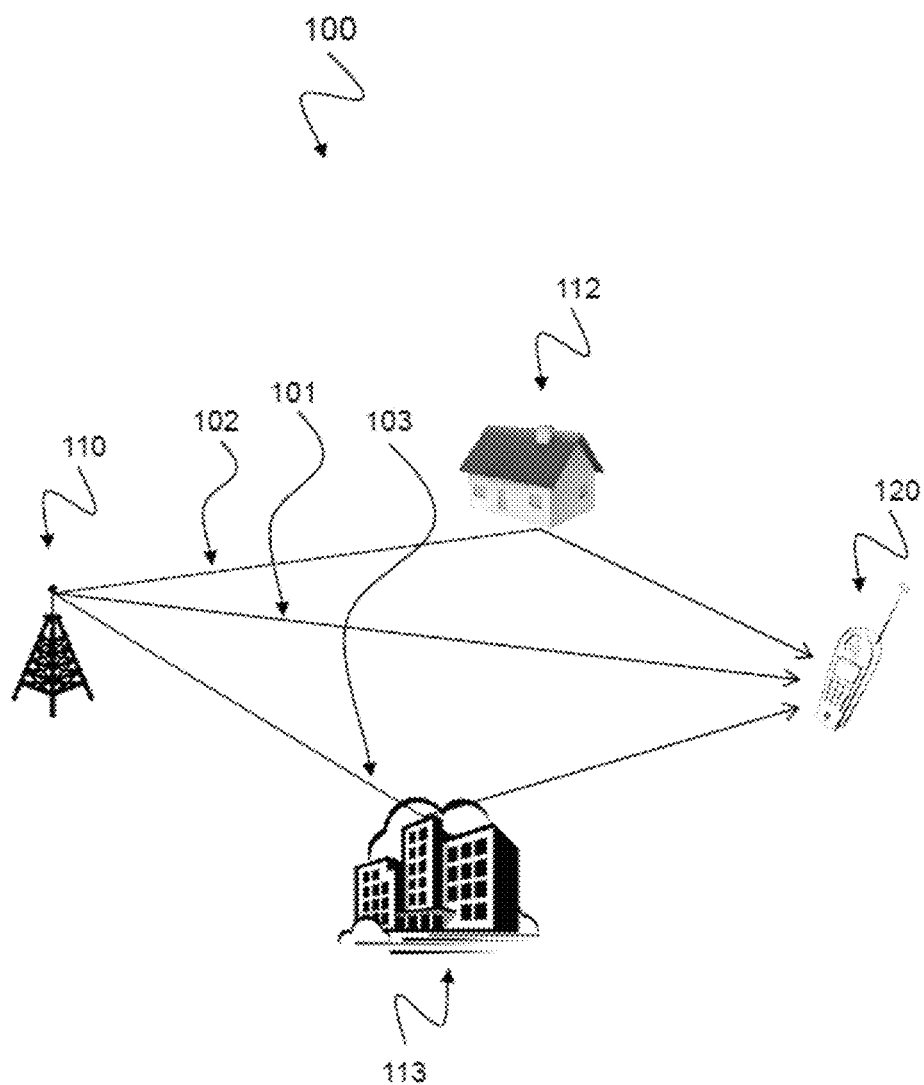
FIG. 1 is a schematic diagram illustrating a wireless system 100 including a base station 110 and a mobile station 120, the mobile station 120 applying techniques for determining covariance measures based on correlation criteria.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:
IRC: Interference Rejection Combining,
ST-IRC: Spatial-Temporal Interference Rejection Combining,
MMSE: Minimum Mean Square Error,
AP: Antenna Port,
SINR: Signal to Interference and Noise Ratio,
RF: Radio Frequency,
UE: User Equipment,
BLER: Block Error Rate,
G-Rake: Generalized Rake receiver,
WIC: Wiener Interference Cancellation,
QoS: Quality of Service,
Tc: chip duration,
Osf: Oversampling factor
VA: 3GPP Vehicular A channel model, e.g. according to 3GPP TR 25.890 V1.0.0 (2002-05),
PB: 3GPP Pedestrian B channel model, e.g. according to 3GPP TR 25.890 V1.0.0 (2002-05),
UMA: Urban Macro channel model, e.g. according to 3GPP TR 36.814 V9.0.0 (2010-03),
HT: Hilly Terrain channel model, e.g. according to 3GPP TR 25.943 V9.0.0 (2010-02),
DIP: Dominant Interferer Profile,
PDP: Power Delay Profile,
OCNS: Orthogonal Channel Noise Simulator,
PICH: Pilot Channel,
CPICH: Common Pilot Channel,
SCH: Supplementary Channel,
CCPCH: Common Control Physical Channel,
QPSK: Quadrature Phase Shift Keying,
DPCH: Dedicated Physical Channel,
UMTS: Universal Mobile Telecommunications System,
TD SCDMA: Time Division Synchronous Code Division Multiple Access.

The methods and devices described herein may be based on time-domain receivers including equalizers having equalizer taps, for example RAKE receivers having RAKE fingers and covariance measures. It is understood that comments made in connection with a described method may also hold true for a corresponding device configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on 3G, UMTS, GSM, CDMA and TD-SCDMA standards. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

In the following, 3G receivers with respect to interference, diversity and Quality-of-Service (QoS) are described. The performance of a 3G receiver is limited due to intra- and inter-cell interference. Even at high geometries the post-equalization signal-to-interference-and-noise ratio (SINR) of a typical rake receiver does not necessarily improve due to severe multi-path interference. This may result in a high error floor with respect to block error rate (BLER). Hence, the eNodeB may have to allocate a large amount of power for the user equipment (UE) to meet a QoS requirement. Since the power at the eNodeB may be limited, allocating a large fraction of the available power to a particular UE may drastically degrade the system capacity. The usage of receive diversity time-domain receivers, for example rake receivers may improve the post-equalization SINR which may lead to an increased system capacity. The gain caused by diversity may be limited since the receiver may still be interference-limited and the receive diversity gain may vanish in the presence of correlated antennas.

In the following, Type-3i receivers are described. Type-3i receivers may be interference aware diversity receivers, e.g. according to 3GPP technical report TR 25.963 V11.0.0 (2012-09). Interference aware receivers, referred to as type 2i and type 3i, may be defined as extensions of the existing type 2 and type 3 receivers, respectively. The basic receiver structure may be that of an LMMSE sub-chip level equalizer which may take into account not only the channel response matrix of the serving cell, but also the channel response matrices of the most significant interfering cells.

In the following, covariance measures, covariance matrices, signal covariance measures, noise covariance measures and interference covariance measures are described. The covariance measure may generalize the notion of variance to multiple dimensions. As an example, the variation in a collection of random points in two-dimensional space may not necessarily be characterized fully by a single number, nor would the variances in the x and y directions contain all of the necessary information. A $N_{Rx} \times N_{Rx}$ measure, where $N_{Rx}$ denotes the number of receive antennas, called the covariance measure may be necessary to fully characterize the two-dimensional variation. The covariance measure can be mathematically implemented as a covariance matrix, for example.

In probability theory and statistics, a covariance matrix (also known as dispersion matrix or variance covariance matrix) may be a matrix whose element in the position i, j is the covariance between the $i^{th}$ and $j^{th}$ elements of a random vector (that is, of a vector of random variables). Each element of the vector may be a scalar random variable, either with a finite number of observed empirical values or with a finite or infinite number of potential values specified by a theoretical joint probability distribution of all the random variables. If the entries in a column vector $X=(X_1, \ldots, X_n)^T$ are random variables, each with finite variance, then the covariance matrix S may be the matrix whose entry (i,j) is the covariance $cov(X_i, X_j) = E[(X_i - \mu_i)(X_j - \mu_j)]$, wherein $\mu_i = E(X_i)$ is the expected value of the i-th entry in the vector X.

In the following, Multiple-Input Multiple-Output (MIMO) systems are described. Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

Figure 2A:
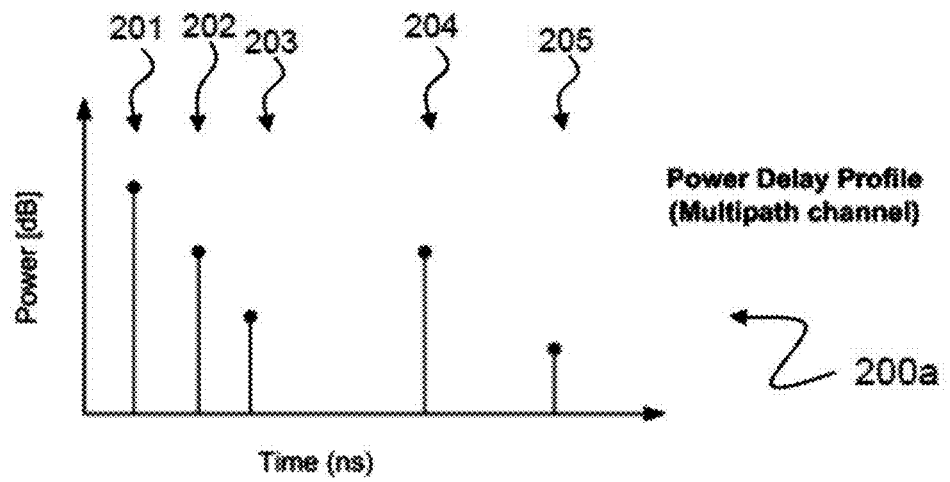
FIG. 2a is a schematic diagram illustrating a power delay profile 200a of a multipath channel.

In the following, time-domain receivers such as rake receivers and equalizer taps such as RAKE fingers are described. A time-domain receiver such as a rake receiver is a radio receiver designed to counter the effects of multipath fading. This may be performed by using several "sub-receivers" called taps, equalizer taps, paths, fingers or RAKE fingers, that is, several correlators each assigned to a different multipath component. Each tap or finger may independently decode a single multipath component. At a later stage, the contribution of all taps or fingers may be combined in order to make the most use of the different transmission characteristics of each transmission path. This may result in higher signal-to-noise ratio (SNR) in a multipath environment. FIG. 1 depicts a wireless system 100 including a base station 110 and a mobile station 120, the mobile station 120 applying techniques for determining covariance measures based on correlation criteria as described in the following. The multipath channel through which a radio wave transmits from a base station 110 to a mobile station 120 can be viewed as transmitting the original (line-of-sight) wave pulse 101 through a number of multipath components 101, 102, 103 due to obstacles 112, 113. Multipath components are delayed copies of the original transmitted wave traveling through a different echo path, each with a different magnitude and time-of-arrival at the receiver. Since each component contains the original information, if the magnitude and time-of-arrival (phase) of each component is computed at the receiver through a process called channel estimation, then all the components can be added coherently to improve the information reliability. The three exemplary multipath components 101, 102 and 103 depicted in FIG. 1 may correspond to different paths 201, 202, 203 as illustrated in FIG. 2a described below.

Figure 2B:
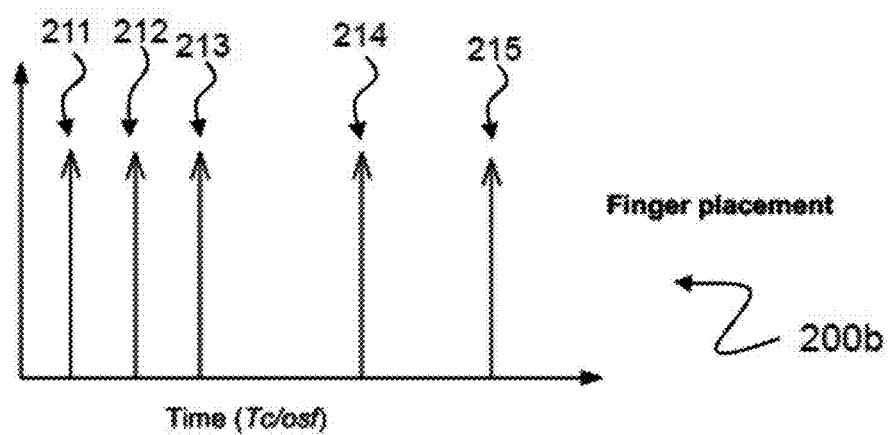
FIG. 2b is a schematic diagram illustrating a finger placement 200b matching the power delay profile 200a of the channel with a resolution of Tc/osf (chip duration versus oversampling factor) in a spatial-temporal interference rejection combining method.

In the following, Spatial-Temporal Interference Rejection Combining (ST-IRC) systems are described. A Spatial-Temporal Interference rejection combiner may not only take into account the correlation of interference and noise between different taps or fingers after de-spreading, but may also account for the spatial correlation of the interference. The received signal y from different taps or fingers after the Despreader is denoted in equation (1). It is assumed that the same set of taps or fingers, also called delays or time delays, is used for different receive antennas. FIGS. 2a and 2b illustrate an exemplary finger placement method where the UE sets the taps or finger matching the power delay profile of the channel, but the resolution of the finger placement is limited to Tc/osf, where Tc is the chip duration and osf is the oversampling factor. In a power delay profile (PDP) 200a, the multipath channel includes a first path 201, a second path 202, a third path 203, a fourth path 204 and a fifth path 205. The tap or finger placement 200b is matching the PDP 200a of the channel with a resolution of Tc/osf, i.e., a first finger 211 corresponds to the first path 201, a second finger 212 corresponds to the second path 202, a third finger 213 corresponds to the third path 203, a fourth finger 214 corresponds to the fourth path 204 and a fifth finger 215 corresponds to the fifth path 205.

The received signal y from different fingers after the despreader can be expressed as $$y = hx + e. \quad (1)$$

M is the number of receive antennas, K is the number of fingers, $y = [y_1^T \ldots y_K^T]^T$ is the received signal of size (M×K)×1 after the despreader, $h = [h_1^T \ldots h_K^T]^T$ is the channel coefficients of dimension (M×K)×1, $e = [e_1^T \ldots e_K^T]^T$ is the interference and noise vector of dimension (M×K)×1. $y_l$, $h_l$ and $e_l$ correspond to a particular path/finger l and are of dimension M.

The covariance of the noise and interference $R_e$ may be written as in equation (2). One can observe that $R_e$ may not only contain the correlation of the noise and interference between identical fingers (between different receive antennas), but also the correlation between different fingers. The covariance matrix can be estimated as follows:

$$R_e = E(ee^H) = \begin{pmatrix} R_{e,11} & \cdots & R_{e,1K} \\ \vdots & \ddots & \vdots \\ R_{e,K1} & \cdots & R_{e,KK} \end{pmatrix}, \quad (2)$$

where $R_e$ is the covariance of noise and interference of dimension (M×K)×(M×K) and $R_{e,ij}$ is the covariance of noise and interference between fingers i and j and is of dimension M×M.

Using the estimated covariance matrix, the interference may be suppressed as in equation (3)

$$\hat{x} = h^H R_e^{-1} y = h^H R_e^{-1} hx + h^H R_e^{-1} e. \quad (3)$$

The post-equalization SINR due to the equalization/combining may be given by equation (4)

$$\gamma = \frac{w^H h h^H w}{w^H R_e w} = h^H R_e^{-1} h, \quad (4)$$

where $$w = R_e^{-1} h$$

ST-IRC systems may have the disadvantages of high complexity and sensitivity to finger placement errors.

In the following, a Generalized Rake (G-Rake) receiver (Type-3i) is described. A G-Rake receiver may basically correspond to a ST-IRC. The only difference between the two receivers may lie in the finger placement strategy. As opposed to a ST-IRC, G-Rake places fingers may not only match the power delay profile of the channel, but may also place so called probing fingers whose delay not necessarily correspond to a path of a multipath channel. The motivation behind the probing fingers may be to better capture the correlation structure of the noise and interference. It is obvious that the equations (1) to (4) also apply to G-Rake with the exception that the number of fingers K may be greater than or equal to the number of paths L of the multi-path channel.

Figure 2C:
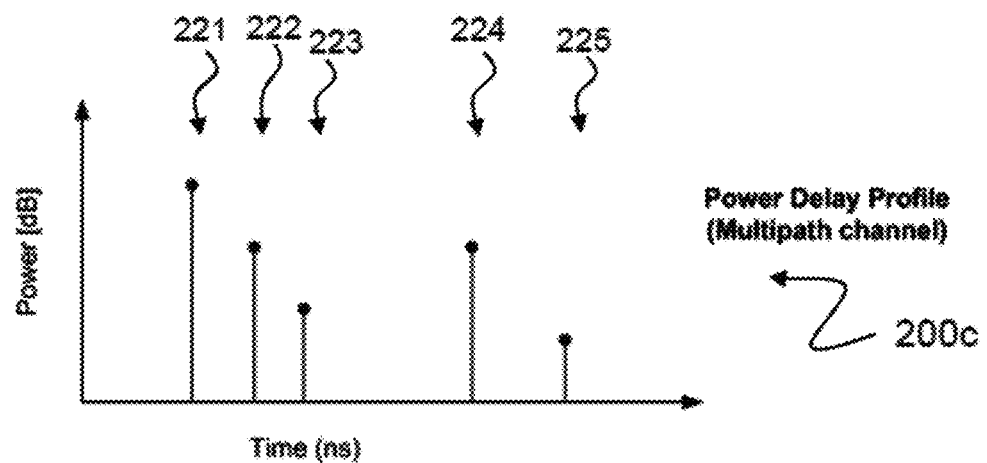
FIG. 2c is a schematic diagram illustrating a power delay profile 200c of a multipath channel.
Figure 2D:
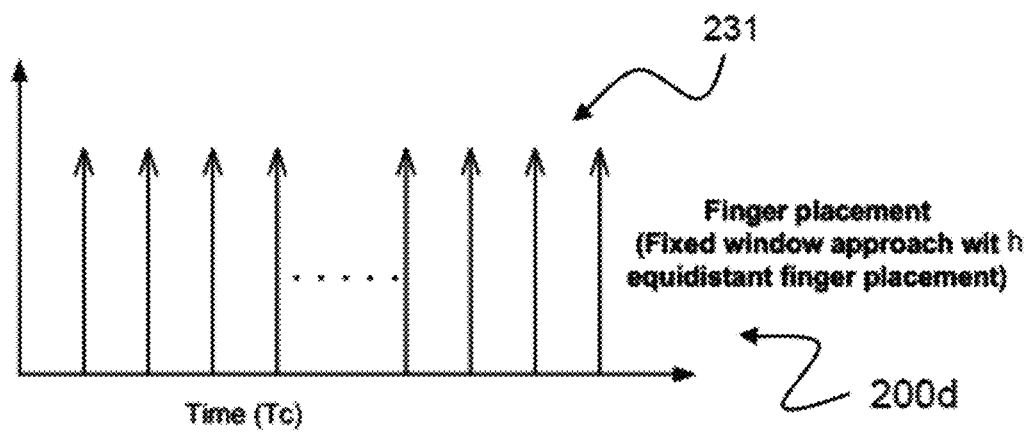
FIG. 2d is a schematic diagram illustrating a fixed window finger placement 200d with equidistant finger placement in a General Rake receiver.

Although many heuristic finger placement algorithms exist for G-Rake, they may be very sensitive to delay errors caused by DPE (Delay Profile Estimator). In the fixed window approach, fingers 231 may be placed 200d equidistantly over the delay span of the channel as shown in FIGS. 2c and 2d. In the corresponding power delay profile 200c, the multipath channel may include a first path 221, a second path 222, a third path 223, a fourth path 224 and a fifth path 225. This approach may be very robust against delay errors. However, due to the limited numbers of fingers available in a receiver only a finite window size may be affordable. Typically a window size of 20 chips (~5.2 µs) may be used for Type-3i receivers which may cause severe performance degradation in heavily dispersive channels.

G-Rake receivers may have the disadvantages of very high complexity, since very large matrices may need to be inverted leading to sub-optimal iterative inversion algorithms and bad performance in heavily dispersive channels due to long delay spreads.

In the following, Wiener Interference Cancellation (WIC) is described. Wiener Interference Cancellation (WIC) can be used to suppress intra- and inter cell interference. For WIC, the following assumptions are made. The power delay profiles of the multi-path channel for all received antennas are identical. The assumption is realistic, since the antenna spacing in a UE is typically a fraction of the wavelength. Interference may be spatially correlated and temporally white. The above assumptions may lead to a block-diagonal matrix containing only the spatial correlation of interference and noise as in equation (5).

$$R_{e,wic} = \begin{pmatrix} R_{e,11} & \cdots & 0 \\ \vdots & \ddots & \vdots \\ 0 & \cdots & R_{e,KK} \end{pmatrix}. \quad (5)$$

From equations (5) and (6) it can be seen that it is possible to decouple the system so that the spatial combining weights for each group of fingers with the same delay can be determined separately followed by a temporal combining $$\hat{x} = h^H R_{e,wic}^{-1} y = \sum_{l=1}^{K} h_l^H R_{e,ll}^{-1} y_l. \quad (6)$$

The post-equalization SINR due to the equalization/combining may be given by $$\gamma = \sum_{l=1}^{K} \frac{w_l^H h_l h_l^H w_l}{w_l^H R_{e,ll} w_l} = \sum_{l=1}^{K} h_l^H R_{e,ll}^{-1} h_l, \quad (7)$$

where $$w_l = R_{e,ll}^{-1} h_l.$$

One can see that the assumptions made may provide a robust and low-complexity interference suppression as opposed to ST-IRC or Type-3i receivers. It is noted that Wiener Interference Cancellation may have the disadvantage of inferior performance than ST-IRC or a Type-3i receiver for low/medium delay spread channels, since temporal correlation of noise and interference is ignored.

FIG. 3 is a schematic diagram of an exemplary covariance measure 300 of noise and interference in the form of a matrix of dimension (M×K)×(M×K). Observations of finger placement methods described above with respect to FIGS. 1 and 2b have shown that a) spatial correlation of noise and interference may be always present irrespective of finger placement or the power delay profile of the multi-path channel; b) temporal correlation between different fingers may be significant between closely spaced fingers (few chips apart); and c) temporal correlation between fingers spaced far apart may be negligible. These observations may provide a motivation to design a noise and covariance matrix having a different structure as described in the following.

The noise and interference covariance matrix may be modeled as in following equation (8). Both temporal and spatial correlation may be considered for the fingers 1 to N which are closely spaced and only spatial correlation may be considered fingers N+1 to K which are not closely spaced:

$$R_e \approx \begin{pmatrix} R_{e,11} & \cdots & R_{e,1N} & 0 & \cdots & 0 \\ \vdots & \ddots & \vdots & \vdots & \ddots & \vdots \\ R_{e,N1} & \cdots & R_{e,NN} & 0 & \cdots & 0 \\ 0 & \cdots & 0 & R_{e,N+1N+1} & \ddots & \vdots \\ \vdots & \ddots & \vdots & \ddots & \ddots & 0 \\ 0 & \cdots & 0 & \cdots & 0 & R_{e,KK} \end{pmatrix},$$

where $R_e$ is the covariance of noise and interference which is of dimension (M×K)×(M×K).

In one example, the covariance matrix of equation (8) may include multiple sections of both temporal and spatial correlation as exemplarily depicted in equation (8) for the fingers 1 to N which are closely spaced. In addition, the covariance matrix of equation (8) may include multiple sections of only spatial correlation as exemplarily depicted in equation (8) for the fingers N+1 to K which are not closely spaced.

Substituting the covariance matrix of equation (8) into equation (3) may result in $$\hat{x} = h^H R_e^{-1} y = \underbrace{\tilde{h}^H \tilde{R}_e^{-1} \tilde{y}}_{\text{Spatial-Temporal combining}} + \underbrace{\sum_{l=N+1}^{K} h_l^H R_{e,ll}^{-1} y_l}_{\text{Spatial combining}} \quad (9)$$

where $\tilde{h}$ is the channel coefficients of the closely spaced fingers of dimension (N×M)×1, and $\tilde{y}$ is the despreader output of the closely spaced fingers of dimensions (N×M)×1. In addition, $$\tilde{R}_e = \begin{pmatrix} R_{e,11} & \cdots & R_{e,1N} \\ \vdots & \ddots & \vdots \\ R_{e,N1} & \cdots & R_{e,NN} \end{pmatrix}$$

is the covariance of interference and noise of the closely spaced fingers and is of dimension (N×M)×(N×M). From equation (9) it can be seen that the system is decoupled into 1+K−N independent combining weights. The combining weights for the closely spaced fingers take into account both spatial and temporal correlation of the interference and noise. The combining weights for the other fingers only take into account the spatial correlation.

The post-equalization SINR of the above combining may be expressed by $$\gamma = \frac{\tilde{w}^H \tilde{h} \tilde{h}^H \tilde{w}}{\tilde{w}^H \tilde{R}_e \tilde{w}} + \sum_{l=N+1}^{K} \frac{w_l^H h_l h_l^H w_l}{w_l^H R_{e,ll} w_l} \quad (10)$$

$$= \tilde{h}^H \tilde{R}_e^{-1} \tilde{h} + \sum_{l=N+1}^{K} h_l^H R_{e,ll}^{-1} h_l,$$

where $w_l = R_{e,ll}^{-1} h_l$ $\tilde{w} = \tilde{R}_e^{-1} \tilde{h}.$

Referring back to the above example, in which the covariance matrix of equation (8) may include multiple sections of both temporal and spatial correlation as well as multiple sections of only spatial correlation, equations (9) and (10) may include multiple terms with regard to spatial-temporal combining and multiple sums with regard to (only) spatial combining.

The application of aspects of the disclosure to achieve a near-optimal ST-IRC is straight-forward and no new finger placement algorithm is needed. Since the number of fingers N used for computing spatial-temporal combining weights is less than the total number of fingers K, the complexity reduction with respect to an Optimal Spatial-Temporal IRC may be due to the computation/estimation of the covariance matrix and the inverse computation of the covariance matrix.

Figure 4A:
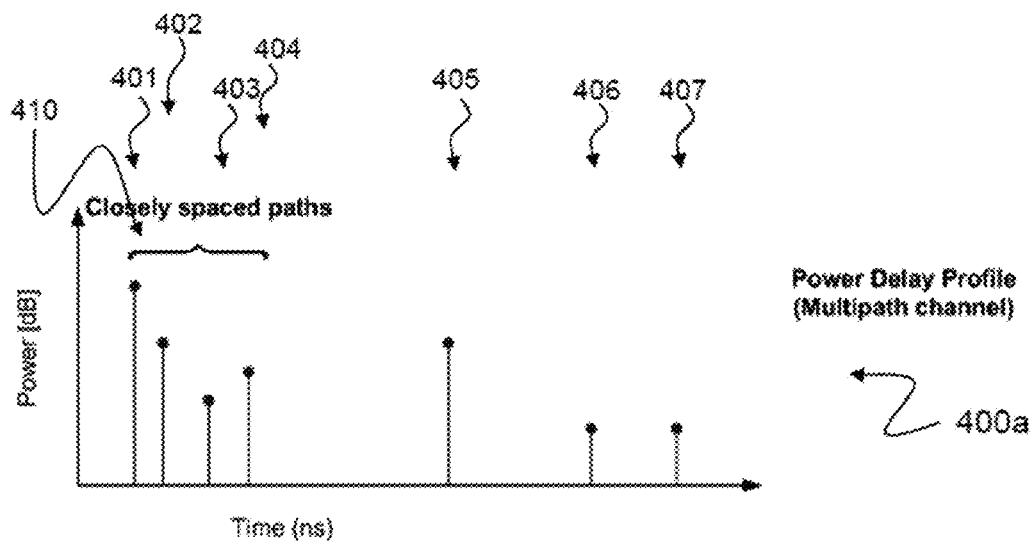
FIG. 4a is a schematic diagram illustrating an exemplary power delay profile 400a of a multipath channel.
Figure 4B:
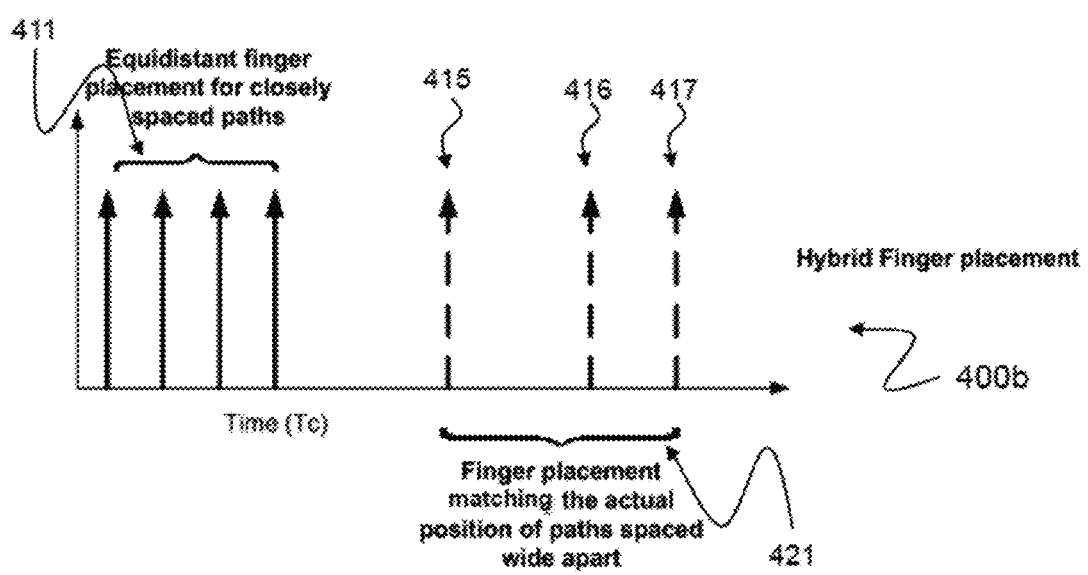
FIG. 4b is a schematic diagram illustrating an exemplary hybrid finger placement 400b with a first section 411 of equidistant finger placement for closely spaced paths and a second section 421 of finger placement matching the actual position for paths spaced wide apart.

FIG. 4a is a schematic diagram illustrating an exemplary power delay profile 400a of a multipath channel, and FIG. 4b is a schematic diagram illustrating an exemplary hybrid finger placement 400b with a first section 411 of equidistant finger placement for closely spaced paths and a second section 421 of finger placement matching the actual position for paths spaced wide apart.

Aspects of the disclosure may be applied to obtain a reduced complexity and near-optimal Type-3i receiver. One can apply the approximation mentioned above with respect to equations (8) to (10) and the fixed window approach for a hybrid finger placement strategy as depicted in FIG. 4b to further reduce complexity. Such hybrid finger placement strategy may include the following parts: Equidistant finger placement 411 with a fixed window size, e.g. 3 to 5 chips, over the span of the closely spaced paths 410 including the exemplary depicted first path 401, second path 402, third path 403 and fourth path 404 as well as finger placement matching the actual position 421 of the paths that are widely spaced including the exemplary depicted fifth path 405, sixth path 406 and seventh path 407.

Application of the above mentioned hybrid finger placement method in a type-3i receiver, for example, may have the following advantages: Less computational complexity, smaller covariance matrix an thus reduced computation for covariance estimation and inverse computation, reduced number of fingers and thus less memory constraints and saving of finger related processing like de-spreading, descrambling, channel estimation, etc. Unlike a Type-3i receiver with fixed window placement the low complexity Type-3i receiver using hybrid finger placement can handle channels with very high delay spreads.

Even limiting the equidistant finger placement to the fingers over which spatial-temporal combining weights are computed does not necessarily degrade performance of the hybrid finger placement receiver since placing fingers at delays not necessarily corresponding to actual path positions may be advantageous only for computing spatial-temporal combining weights and not for spatial-combining weights. The whole idea of such finger placements may be to better capture the temporal correlation of noise and interference and thus blindly applying a fixed window approach of window size approximately equal to the delay span of the multi-path channel may be redundant for the hybrid finger placement receiver.

The noise and interference covariance matrix according to equation (8) can be determined by using the following method. The method includes receiving signals at a plurality of sets of RAKE fingers, wherein each set is coupled to a respective one of a plurality of antenna ports. The method further includes determining data corresponding to a noise and interference covariance matrix based on the received signals, wherein a first part of the noise and interference covariance matrix includes a first covariance measure associated with first RAKE fingers of a first subset of the sets of RAKE fingers, wherein the first covariance measure is based on a first correlation criterion, and a second part of the noise and interference covariance matrix includes a second covariance measure associated with second RAKE fingers of a second subset of the sets of RAKE fingers, wherein the second covariance measure is based on a second correlation criterion.

In one example, the first correlation criterion may be based on a temporal correlation and a spatial correlation, and the second correlation criterion may be based only on a spatial correlation. The first correlation criterion may describe the temporal and spatial correlation of the first to fourth paths 401, 402, 403, 404 of the power delay profile 400a depicted in FIG. 4a while the second correlation criterion may describe the spatial correlation of the fifth to seventh paths 405, 406, 407 of the power delay profile 400a. In one example, the noise and interference covariance matrix may be of dimension (M×K)×(M×K), wherein M denotes a number of antenna ports and K denotes a number of RAKE fingers per set of RAKE fingers. In one example, the noise and interference covariance matrix may be a block diagonal matrix, i.e. a block matrix which is a square matrix having square matrices as main diagonal blocks, such that the off-diagonal blocks are zero. When the noise and interference covariance matrix $R_e$ is a block diagonal matrix with K sub-matrices $R_{e,1} \ldots R_{e,K}$ on the diagonal, e.g., according to $$R_e = \begin{pmatrix} R_{e,1} & \cdots & 0 \\ \vdots & \ddots & \vdots \\ 0 & \cdots & R_{e,K} \end{pmatrix},$$

then $R_e$ can be inverted if each of the sub-matrices $R_{e,1} \ldots R_{e,K}$ is invertible. In this case, $R_e^{-1}$ may also be a block diagonal matrix, identically partitioned to $R_e$, and may be expressed as $$R_e^{-1} = \begin{pmatrix} R_{e,1}^{-1} & \cdots & 0 \\ \vdots & \ddots & \vdots \\ 0 & \cdots & R_{e,K}^{-1} \end{pmatrix}.$$

In one example, the first part of the noise and interference covariance matrix may correspond to at least one first diagonal block in the noise and interference covariance matrix, and the second part of the noise and interference covariance matrix may correspond to at least one second diagonal block in the noise and interference covariance matrix.

Figure 5:
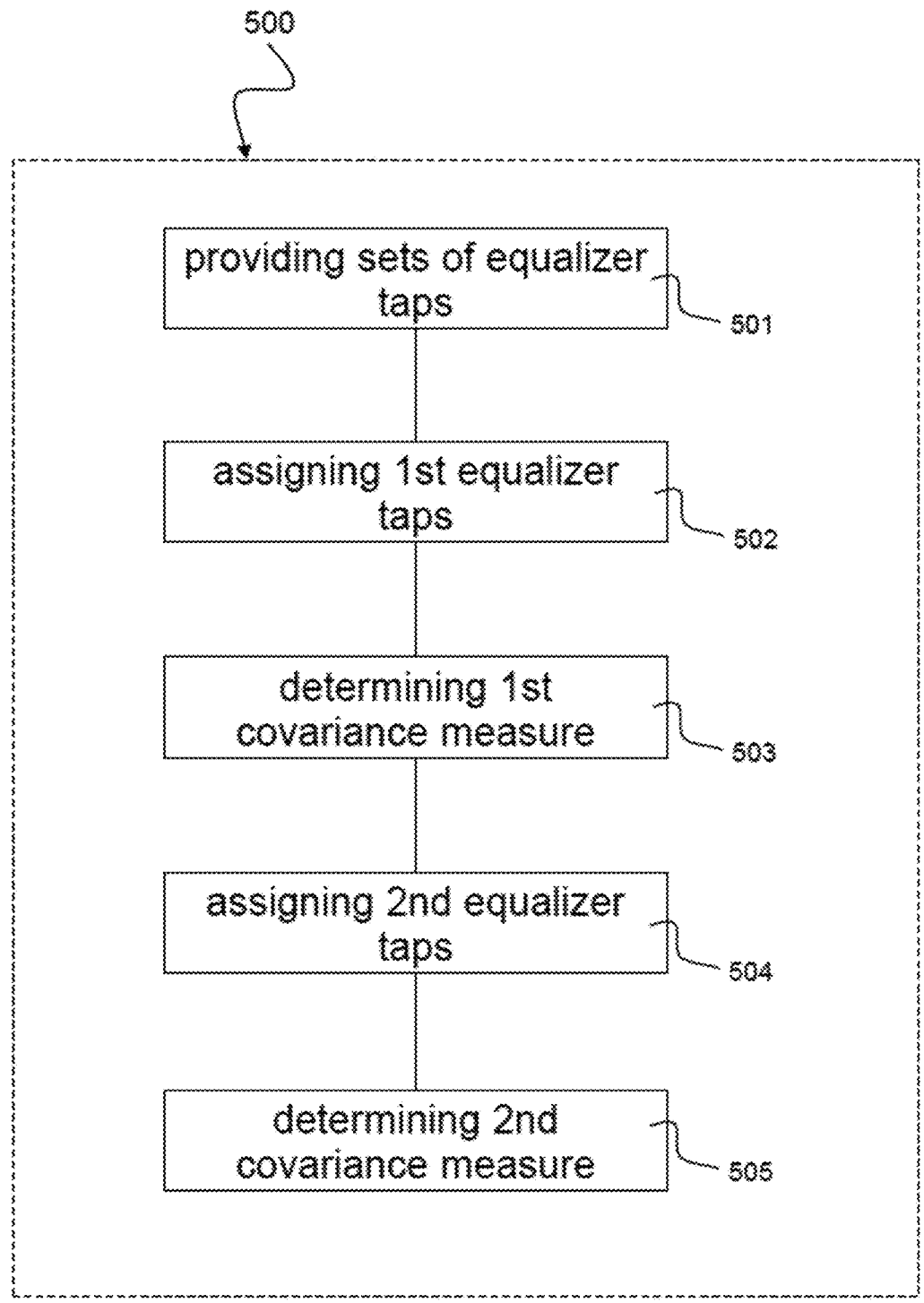
FIG. 5 is a schematic diagram of a method 500 in accordance with the disclosure for determining first and second covariance measures based on first and second correlation criteria.

FIG. 5 is a schematic diagram of a method 500 in accordance with the disclosure for determining first and second covariance measures based on first and second correlation criteria. The method 500 may include the following blocks which are not necessarily limited to a specific sequence: providing a plurality of sets of equalizer taps (see 501), wherein each set is coupled to a respective one of a plurality of antenna ports, assigning first equalizer taps of the sets of equalizer taps to a first subset (see 502), determining a first covariance measure associated with the first equalizer taps of the first subset based on a first correlation criterion (see 503), assigning second equalizer taps of the sets of equalizer taps to a second subset (see 504), and determining a second covariance measure associated with the second equalizer taps of the second subset based on a second correlation criterion (see 505).

In one example, the method 500 may include that the first correlation criterion may be based on a temporal correlation and a spatial correlation. In one further example, the method 500 may include that the second correlation criterion may be based only on a spatial correlation. In one further example, the method 500 may include that assigning the first equalizer taps may be based on a first threshold value. In one further example, the method 500 may include that time delays associated with the first equalizer taps of the first subset may differ at most by the first threshold value. In one further example, the method 500 may include that the first threshold value may have a value of five chips. In one further example, the method 500 may include that assigning the second equalizer taps may be based on a second threshold value. In one further example, the method 500 may include that time delays associated with the second equalizer taps of the second subset may differ at least by the second threshold value. In one further example, the method 500 may include that the second threshold value may have a value of twenty chips. In one further example, the method 500 may include that the first equalizer taps of the first subset may be equidistantly spaced. In one further example, the method 500 may include that the second equalizer taps of the second subset may be non-equidistantly spaced.

Figure 6:
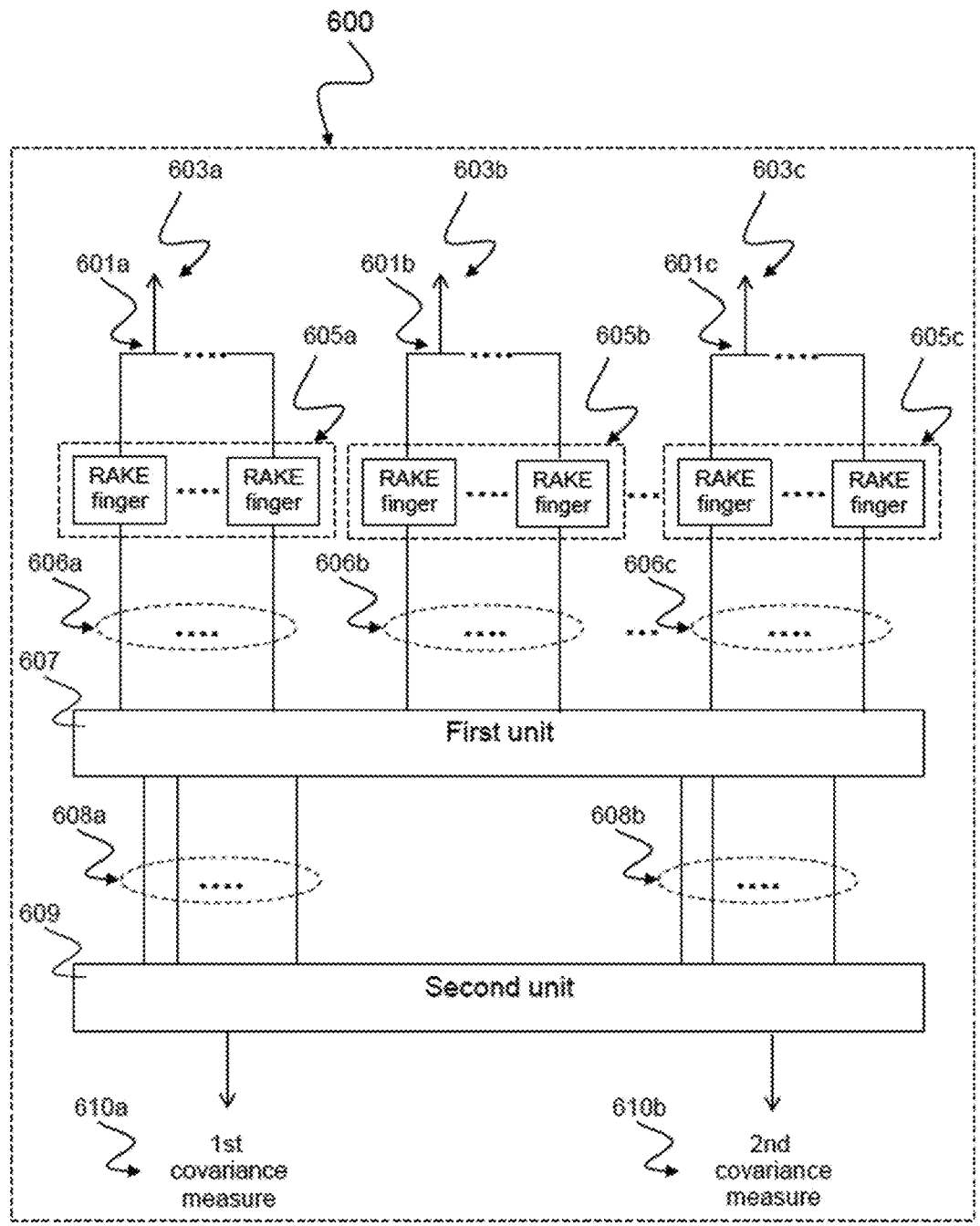
FIG. 6 is a schematic diagram of a device 600 in accordance with the disclosure for determining first and second covariance measures based on first and second correlation criteria.

The method 500 may be implemented in a device as described with respect to FIG. 6. FIG. 6 is a schematic diagram of a device 600 in accordance with the disclosure for determining first and second covariance measures based on first and second correlation criteria.

The device 600 may include a plurality of antenna ports 601a, 601b, 601c receiving radio signals from a plurality of antennas 603a, 603b, 603c. The device 600 may further include a plurality of sets of equalizer taps, e.g. RAKE fingers 605a, 605b, 605c generating multi-path signals 606a, 606b, 606c based on the received radio signals. Each set of RAKE fingers 605a, 605b, 605c may be coupled to a respective one of the plurality of antenna ports 601a, 601b, 601c. The device 600 may further include a first unit 607 assigning first RAKE fingers of the sets of RAKE fingers 605a, 605b, 605c to a first subset 608a and assigning second RAKE fingers of the sets of RAKE fingers 605a, 605b, 605c to a second subset 608b. The device 600 may further include a second unit 609 determining a first covariance measure 610a associated with the first RAKE fingers of the first subset 608a based on a first correlation criterion and determining a second covariance measure 610b associated with the second RAKE fingers of the second subset 608b based on a second correlation criterion.

In one example, the device 600 may include that the first correlation criterion may be based on a temporal correlation and a spatial correlation. In one further example, the device 600 may include that the second correlation criterion may be based only on a spatial correlation. In one further example, the device 600 may include that time delays associated with the first RAKE fingers of the first subset 608a may differ at most by a first threshold value. In one further example, the device 600 may include that time delays associated with the second RAKE fingers of the second subset 608b may differ at least by a second threshold value. In one further example, the device 600 may include that the first RAKE fingers of the first subset 608a may be placed at time delays differing from multi-path positions of the received radio signals. In one further example, the device 600 may include that the first subset 608a may include a number of RAKE fingers differing from a number of multi-path positions of the received radio signals. In one further example, the device 600 may include that the RAKE fingers of the second subset 608b may be placed at time delays matching multi-path positions of the received radio signals. In one further example, the device 600 may include that the second subset 608b may include a number of RAKE fingers matching a number of multi-path positions of the received radio signals.

The devices 600 and the method 500 may thus provide a computation of spatial-temporal combining weights for closely spaced fingers, a computation of spatial combining weights for widely spaced fingers and a summation of the combining results of the spatial-temporal and spatial combiners.

It is noted that the device 600 and the method 500 may show very low complexity and robust performance in a variety of propagation channels such as low, medium and high delay spreads as presented in the following.

FIGS. 7a, 7b, 7c and 7d are performance diagrams illustrating Block Error Rate (BLER) for different channel scenarios. Floating point Matlab simulations were performed with the following system parameters to verify and compare the performance of reduced ST-IRC receivers and reduced type-3i receivers against other receivers. The reduced ST-IRC receivers are based on fixed finger placement with a reduced number of fingers as described above with respect to FIG. 2 while the reduced Type-3i receivers are based on hybrid finger placement with a reduced number of fingers as described above with respect to FIG. 4. Different channels were chosen to reflect various propagation conditions a UE might typically experience such as short, medium and long channels.

The following configuration is used:
UMTS base station with OCNS & Control channels (CPICH, PICH, P-CCPCH,SCH);
DPCH Spreading factor=128, QPSK, Code rate=1/3;
5000 Frames;
2 interfering base stations (eNodeBs) with DIP1=−3 dB, DIP2=
−3 dB;
Oversampling factor→4(base station & Channel), 2(UE);
Channel estimation→Practical channel estimator;
Interference model→Dominant Interferer Profile (DIP) based;
Channel models according to the following:
3GPP Vehicular-A (VA)→Low delay spread channel;
3GPP Pedestrian-B (PB)→Medium delay spread channel;
3GPP SCM Urban-Macro (UMa)→Medium delay spread channel;
Cost-207 Hilly Terrain (HT)→Long delay spread channel;
Geometry→Cell edge (Ior/Ioc=−3 dB).

Table 1 illustrates the power delay profile of different propagation channels used in the simulations.

TABLE 1

Power delay profile of different propagation channels

| Channel Model | Excess tap delay [ns] | Relative Power [dB] | Delay spread (r.m.s) | Delay span |
|---|---|---|---|---|
| VA | 0, 310, 710, 1090, 1730, 2510 | 0, −1, −9, −10, −15, −20 | 370.4 ns | 2510 ns |
| PB | 0, 200, 800, 1200, 2300, 3700 | 0, −0.9, −4.9, −8, −7.8, −23.9 | 633.4 ns | 3700 ns |
| Uma | 0, 360, 252.7, 1038.7, 2730, 4597.7 | 0, −2.22, −1.72, −5.19, −9.05, −12.5 | 841.3 ns | 4597.7 ns |
| HT | 0, 200, 400, 600, 15000, 17200 | 0, −2, −4, −7, −6, −12 | 5035.2 ns | 17200 ns |

Figure 7A:
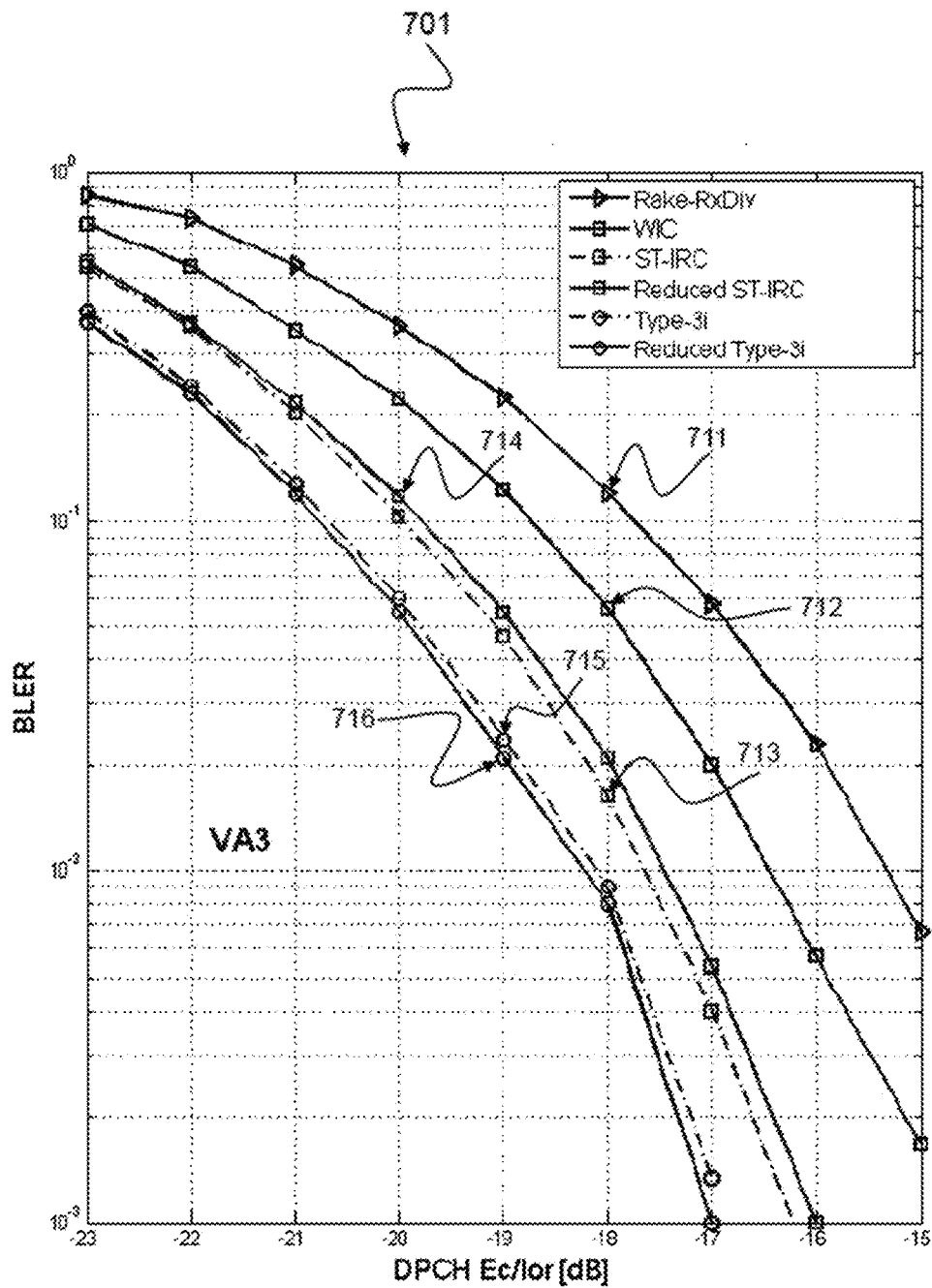
FIG. 7a is a performance diagram 701 illustrating a Block Error Rate for a hybrid finger placement as illustrated in FIG. 4b for a VA3 channel scenario.

FIG. 7a is a performance diagram 701 illustrating a BLER for a reduced finger placement according to both methods ST-IRC and Type-3i as described above with respect to FIGS. 2 and 4 for a VA3 channel scenario. A first curve 711 illustrates the BLER of a Rake receive (RX) diversity receiver. A second curve 712 illustrates the BLER of a Wiener Interference Cancellation (WIC) receiver. A third curve 713 illustrates the BLER of a Spatial-Temporal Interference Combining (ST-IRC) receiver. A fourth curve 714 illustrates the BLER of a reduced ST-IRC receiver. A fifth curve 715 illustrates the BLER of a type-3i receiver. A sixth curve 716 illustrates the BLER of a reduced Type-3i receiver.

Figure 7B:
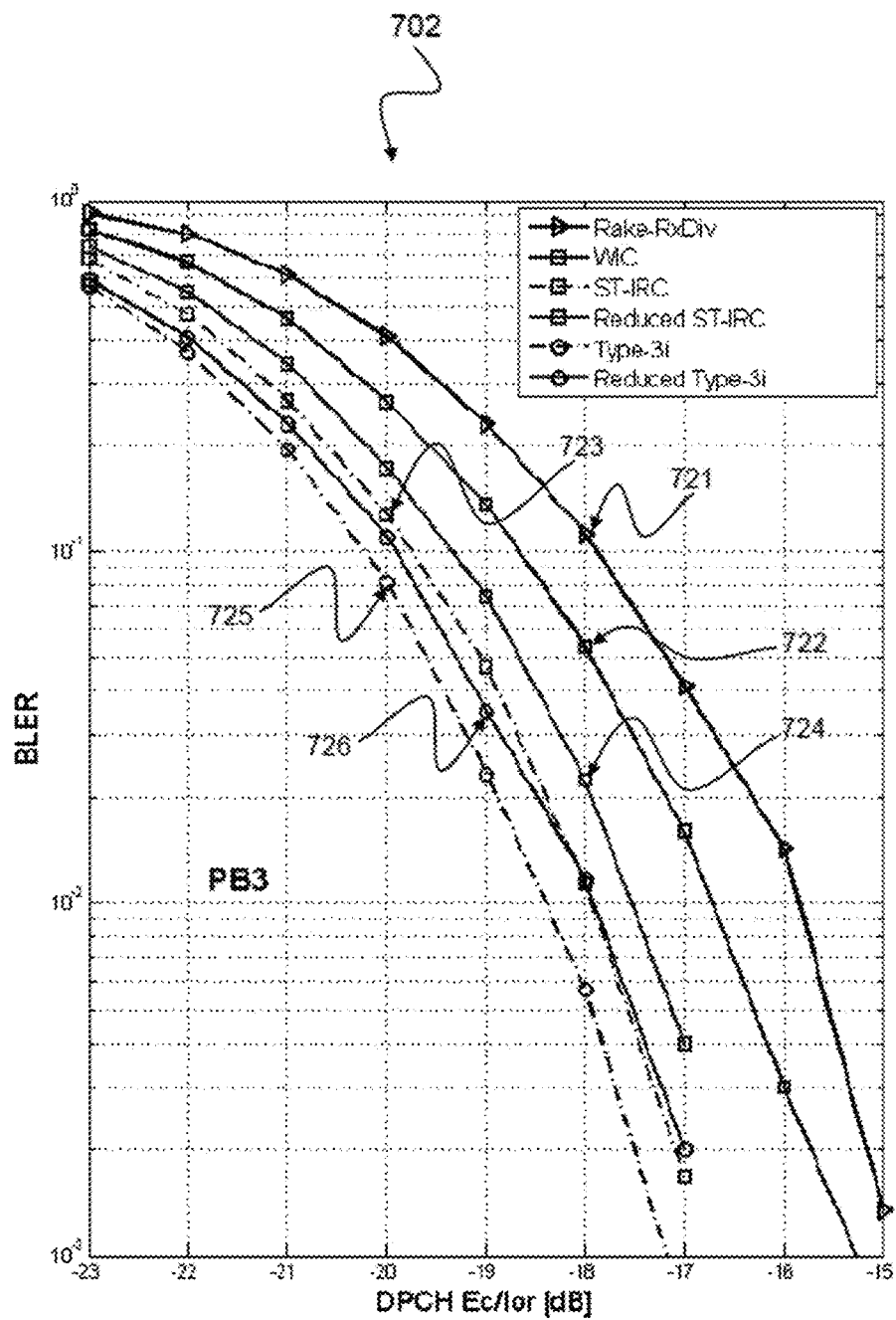
FIG. 7b is a performance diagram 702 illustrating a Block Error Rate for a hybrid finger placement as illustrated in FIG. 4b for a PB3 channel scenario.

FIG. 7b is a performance diagram 702 illustrating a BLER for a reduced finger placement according to both methods ST-IRC and Type-3i as described above with respect to FIGS. 2 and 4 for a PB3 channel scenario. A first curve 721 illustrates the BLER of a Rake receive (RX) diversity receiver. A second curve 722 illustrates the BLER of a Wiener Interference Cancellation (WIC) receiver. A third curve 723 illustrates the BLER of a Spatial-Temporal Interference Combining (ST-IRC) receiver. A fourth curve 724 illustrates the BLER of a reduced ST-IRC receiver. A fifth curve 725 illustrates the BLER of a type-3i receiver. A sixth curve 726 illustrates the BLER of a reduced Type-3i receiver.

Figure 7C:
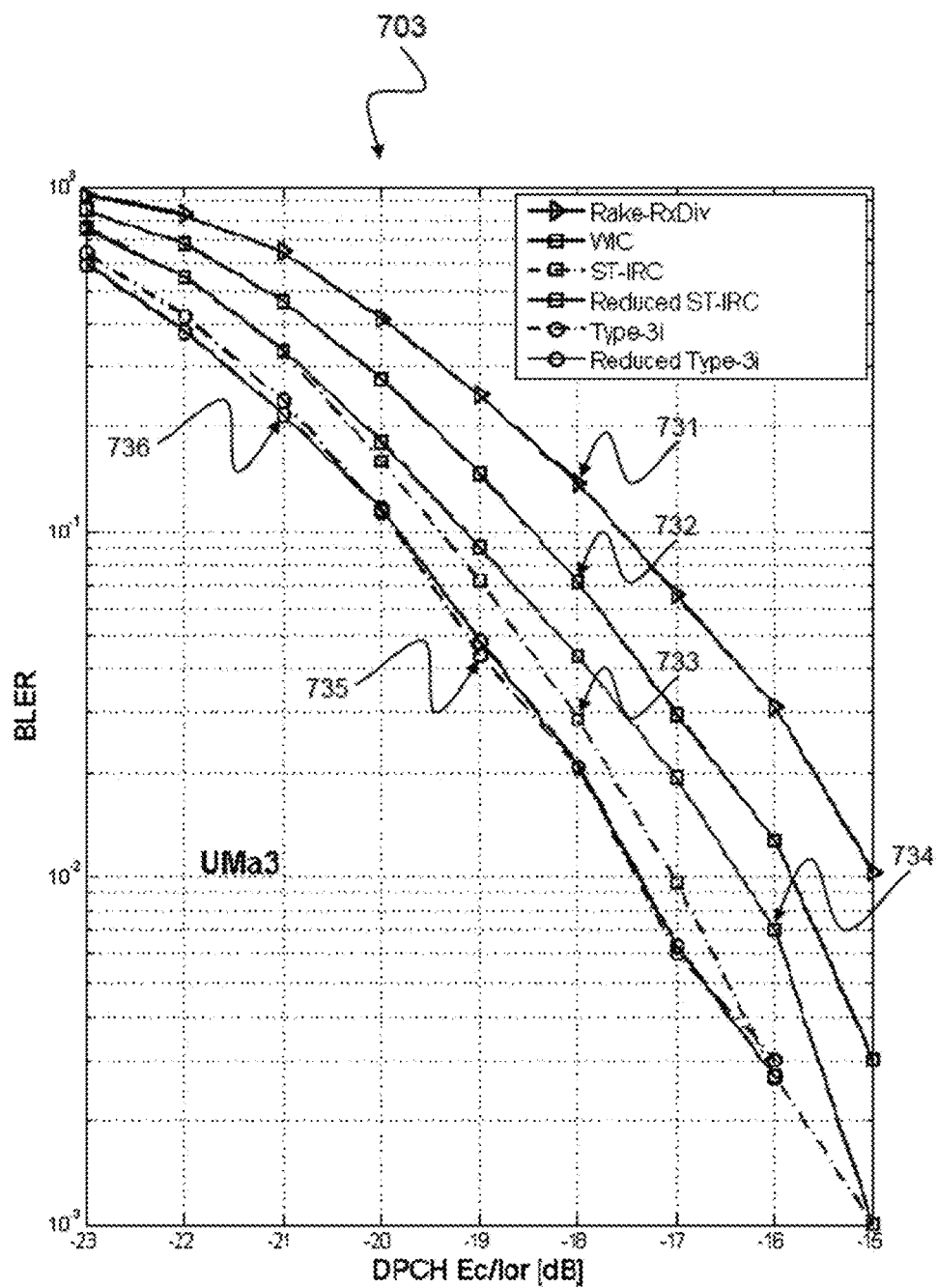
FIG. 7c is a performance diagram 703 illustrating a Block Error Rate for a hybrid finger placement as illustrated in FIG. 4b for a Uma3 channel scenario.

FIG. 7c is a performance diagram 703 illustrating a BLER for a reduced finger placement according to both methods ST-IRC and Type-3i as described above with respect to FIGS. 2 and 4 for a Uma3 channel scenario. A first curve 731 illustrates the BLER of a Rake receive (RX) diversity receiver. A second curve 732 illustrates the BLER of a Wiener Interference Cancellation (WIC) receiver. A third curve 733 illustrates the BLER of a Spatial-Temporal Interference Combining (ST-IRC) receiver. A fourth curve 734 illustrates the BLER of a reduced ST-IRC receiver. A fifth curve 735 illustrates the BLER of a type-3i receiver. A sixth curve 736 illustrates the BLER of a reduced type-3i receiver.

Figure 7D:
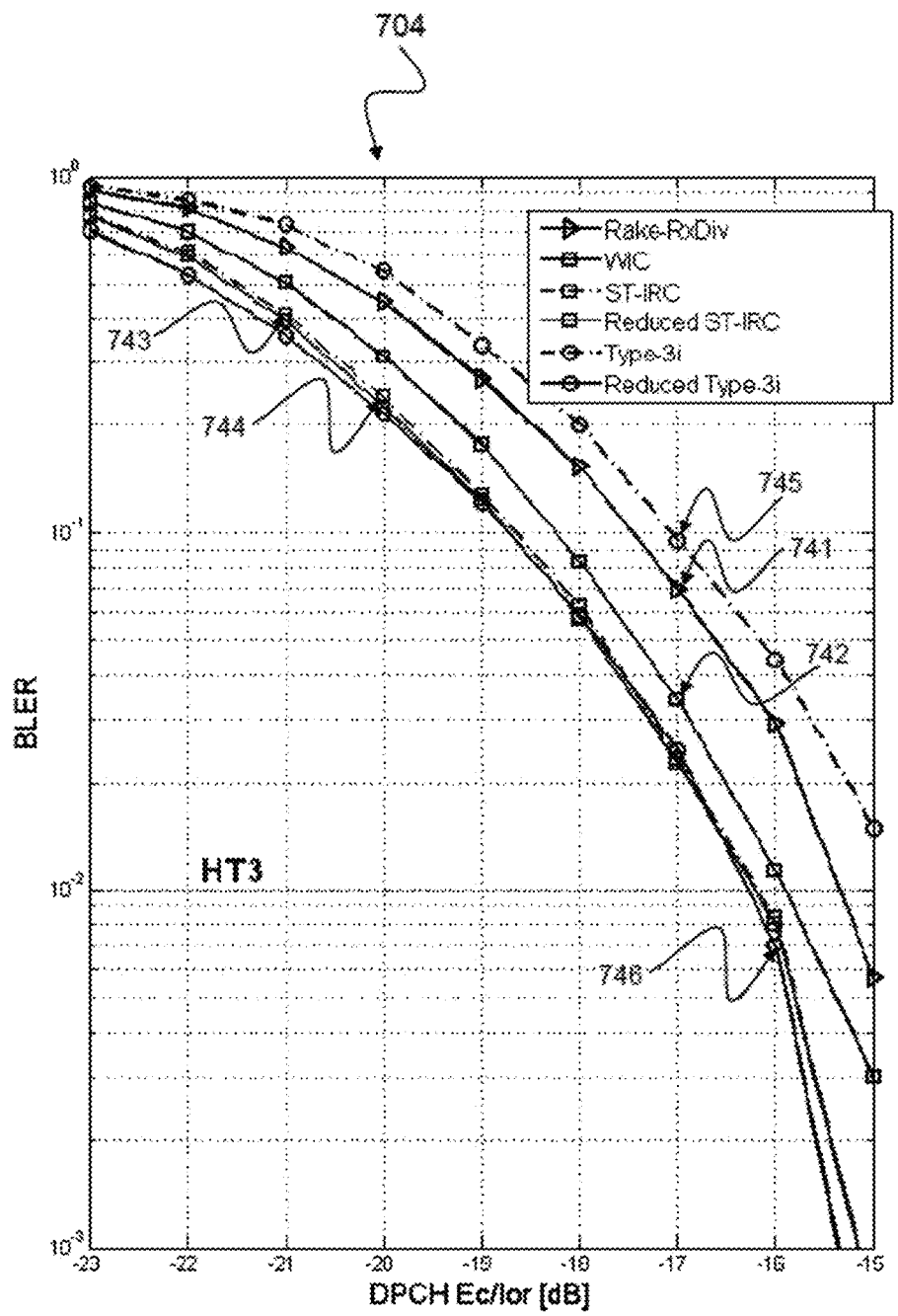
FIG. 7d is a performance diagram 704 illustrating a Block Error Rate for a hybrid finger placement as illustrated in FIG. 4b for a HT3 channel scenario.

FIG. 7d is a performance diagram 704 illustrating a BLER for a reduced finger placement according to both methods ST-IRC and Type-3i as described above with respect to FIGS. 2 and 4 for a HT3 channel scenario. A first curve 741 illustrates the BLER of a Rake receive (RX) diversity receiver. A second curve 742 illustrates the BLER of a Wiener Interference Cancellation (WIC) receiver. A third curve 743 illustrates the BLER of a Spatial-Temporal Interference Combining (ST-IRC) receiver. A fourth curve 744 illustrates the BLER of a reduced ST-IRC receiver. A fifth curve 745 illustrates the BLER of a type-3i receiver. A sixth curve 746 illustrates the BLER of a reduced type-3i receiver.

One can observe the following from FIGS. 7*a*, 7*b*, 7*c* and 7*d*. The performance of receivers applying reduced finger placement according to one of the methods ST-IRC and Type-3i as described above with respect to FIGS. 2 and 4 (Reduced ST-IRC & Reduced Type-3i) may be similar to that of the optimal ST-IRC & Type-3i receivers in low and medium delay spread channels (VA3, PB3, UMa3). The performance of these reduced finger placement receivers may be improved compared to a Type-3i in long delay spread channels (HT3) by about 1.8 dB. The reduced ST-IRC receiver may outperform a rake receiver and a WIC receiver by about 1.2 to 2.0 dB and 0.5 to 1.0 dB, respectively. The reduced Type-3i receiver may outperform a rake receiver and a WIC receiver by about 1.5 to 3 dB and 0.5 to 2 dB, respectively. These reduced finger placement receivers may show robust performance irrespective of channel conditions.

EXAMPLES

The following examples pertain to further embodiments. Example 1 is a method, comprising: providing a plurality of sets of equalizer taps, wherein each set is coupled to a respective one of a plurality of antenna ports; assigning first equalizer taps of the sets of equalizer taps to a first subset; determining a first covariance measure associated with the first equalizer taps of the first subset based on a first correlation criterion; assigning second equalizer taps of the sets of equalizer taps to a second subset; and determining a second covariance measure associated with the second equalizer taps of the second subset based on a second correlation criterion.

In Example 2, the subject matter of Example 1 can optionally include that the first correlation criterion is based on a temporal correlation and a spatial correlation.

In Example 3, the subject matter of any one of Examples 1-2 can optionally include that the second correlation criterion is based only on a spatial correlation.

In Example 4, the subject matter of any one of Examples 1-3 can optionally include that assigning the first equalizer taps is based on a first threshold value.

In Example 5, the subject matter of Example 4 can optionally include that time delays associated with the first equalizer taps of the first subset differ at most by the first threshold value.

In Example 6, the subject matter of Example 4 or 5 can optionally include that the first threshold value has a value of five chips.

In Example 7, the subject matter of any one of Examples 1-6 can optionally include that assigning the second equalizer taps is based on a second threshold value.

In Example 8, the subject matter of any one of Example 7 can optionally include that time delays associated with the second equalizer taps of the second subset differ at least by the second threshold value.

In Example 9, the subject matter of Example 7 or 8 can optionally include that the second threshold value has a value of twenty chips.

In Example 10, the subject matter of any one of Examples 1-9 can optionally include that the first equalizer taps of the first subset are equidistantly spaced.

In Example 11, the subject matter of any one of Examples 1-10 can optionally include that the second equalizer taps of the second subset are non-equidistantly spaced.

Example 12 is a device, comprising: a plurality of antenna ports configured to receive radio signals from a plurality of antennas; a plurality of sets of equalizer taps configured to generate multi-path signals based on the received radio signals, wherein each set of equalizer taps is coupled to a respective one of the plurality of antenna ports; a first unit configured to assign first equalizer taps of the sets of equalizer taps to a first subset and to assign second equalizer taps of the sets of equalizer taps to a second subset; and a second unit configured to determine a first covariance measure associated with the first equalizer taps of the first subset based on a first correlation criterion and to determine a second covariance measure associated with the second equalizer taps of the second subset based on a second correlation criterion.

In Example 13, the subject matter of Example 12 can optionally include that the first correlation criterion is based on a temporal correlation and a spatial correlation.

In Example 14, the subject matter of any one of Examples 12-13 can optionally include that the second correlation criterion is based only on a spatial correlation.

In Example 15, the subject matter of any one of Examples 12-14 can optionally include that time delays associated with the first equalizer taps of the first subset differ at most by a first threshold value.

In Example 16, the subject matter of any one of Examples 12-15 can optionally include that time delays associated with the second equalizer taps of the second subset differ at least by a second threshold value.

In Example 17, the subject matter of any one of Examples 12-16 can optionally include that the first equalizer taps of the first subset are placed at time delays differing from multi-path positions of the received radio signals.

In Example 18, the subject matter of any one of Examples 12-17 can optionally include that the first subset comprises a number of equalizer taps differing from a number of multi-path positions of the received radio signals.

In Example 19, the subject matter of any one of Examples 12-18 can optionally include that the equalizer taps of the second subset are placed at time delays matching multi-path positions of the received radio signals.

In Example 20, the subject matter of any one of Examples 12-19 can optionally include that the second subset comprises a number of equalizer taps matching a number of multi-path positions of the received radio signals.

Example 21 is a method, comprising: receiving signals at a plurality of sets of equalizer taps, wherein each set is coupled to a respective one of a plurality of antenna ports; determining data corresponding to a noise and interference covariance matrix based on the received signals, wherein a first part of the noise and interference covariance matrix comprises a first covariance measure associated with first equalizer taps of a first subset of the sets of equalizer taps, wherein the first covariance measure is based on a first correlation criterion, and a second part of the noise and interference covariance matrix comprises a second covariance measure associated with second equalizer taps of a second subset of the sets of equalizer taps, wherein the second covariance measure is based on a second correlation criterion.

In Example 22, the subject matter of Example 21 can optionally include that the first correlation criterion is based on a temporal correlation and a spatial correlation, and the second correlation criterion is based only on a spatial correlation.

In Example 23, the subject matter of any one of Examples 21-22 can optionally include that the noise and interference covariance matrix is of dimension (M×K)×(M×K), wherein M denotes a number of antenna ports and K denotes a number of equalizer taps per set of equalizer taps.

In Example 24, the subject matter of any one of Examples 21-23 can optionally include that the noise and interference covariance matrix is a block diagonal matrix.

In Example 25, the subject matter of any one of Examples 21-24 can optionally include that the first part of the noise and interference covariance matrix corresponds to at least one first diagonal block in the noise and interference covariance matrix, and that the second part of the noise and interference covariance matrix corresponds to at least one second diagonal block in the noise and interference covariance matrix.

Example 26 is a computer readable medium on which computer instructions are stored which when executed by a computer, cause the computer to perform the method of one of Examples 1 to 11 and 21 to 25.

Example 27 is a receiver, comprising: means for providing a plurality of sets of equalizer taps, wherein each set is coupled to a respective one of a plurality of antenna ports; means for assigning first equalizer taps of the sets of equalizer taps to a first subset; means for determining a first covariance measure associated with the first equalizer taps of the first subset based on a first correlation criterion; means for assigning second equalizer taps of the sets of equalizer taps to a second subset; and means for determining a second covariance measure associated with the second equalizer taps of the second subset based on a second correlation criterion.

In Example 28, the subject matter of Example 27 can optionally include that the first correlation criterion is based on a temporal correlation and a spatial correlation.

In Example 29, the subject matter of any one of Examples 27-28 can optionally include that the second correlation criterion is based only on a spatial correlation.

In Example 30, the subject matter of any one of Examples 27-29 can optionally include that the means for assigning first equalizer taps is configured to assign the first equalizer taps based on a first threshold value.

In Example 31, the subject matter of Example 30 can optionally include that time delays associated with the first equalizer taps of the first subset differ at most by the first threshold value.

In Example 32, the subject matter of Example 30 or 31 can optionally include that the first threshold value has a value of five chips.

In Example 33, the subject matter of any one of Examples 27-32 can optionally include that the means for assigning second equalizer taps is configured to assign the second equalizer taps based on a second threshold value.

In Example 34, the subject matter of Example 33 can optionally include that time delays associated with the second equalizer taps of the second subset differ at least by the second threshold value.

In Example 35, the subject matter of Example 33 or 34 can optionally include that the second threshold value has a value of twenty chips.

In Example 36, the subject matter of any one of Examples 27-35 can optionally include that the first equalizer taps of the first subset are equidistantly spaced.

In Example 37, the subject matter of any one of Examples 27-36 can optionally include that the second equalizer taps of the second subset are non-equidistantly spaced.

Example 38 is a receiver, comprising: means for receiving signals at a plurality of sets of equalizer taps, wherein each set is coupled to a respective one of a plurality of antenna ports; means for determining data corresponding to a noise and interference covariance matrix based on the received signals, wherein a first part of the noise and interference covariance matrix comprises a first covariance measure associated with first equalizer taps of a first subset of the sets of equalizer taps, wherein the first covariance measure is based on a first correlation criterion, and a second part of the noise and interference covariance matrix comprises a second covariance measure associated with second equalizer taps of a second subset of the sets of equalizer taps, wherein the second covariance measure is based on a second correlation criterion.

In Example 39, the subject matter of Example 38 can optionally include that the first correlation criterion is based on a temporal correlation and a spatial correlation, and the second correlation criterion is based only on a spatial correlation.

In Example 40, the subject matter of any one of Examples 38-39 can optionally include that the noise and interference covariance matrix is of dimension $(M \times K) \times (M \times K)$, wherein M denotes a number of antenna ports and K denotes a number of equalizer taps per set of equalizer taps.

In Example 41, the subject matter of any one of Examples 38-40 can optionally include that the noise and interference covariance matrix is a block diagonal matrix.

In Example 42, the subject matter of any one of Examples 38-41 can optionally include that the first part of the noise and interference covariance matrix corresponds to at least one first diagonal block in the noise and interference covariance matrix; and that the second part of the noise and interference covariance matrix corresponds to at least one second diagonal block in the noise and interference covariance matrix.

Example 43 is a transmission system, comprising a receiver according to any one of Examples 27-42; and a transmitter configured to transmit a radio signal via a plurality of antenna ports.

In Example 44, the subject matter of Example 43 can optionally include a plurality of transmit antennas coupled to the antenna ports of the transmitter; and a plurality of receive antennas coupled to the antenna ports of the receiver.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A method, comprising:
providing a plurality of sets of equalizer taps, wherein each set of the equalizer taps is coupled to a respective one of a plurality of antenna ports;
assigning a first plurality of equalizer taps of the sets of equalizer taps to a first subset;
determining a first covariance measure associated with the first plurality of equalizer taps of the first subset based on a first correlation criterion;
assigning a second plurality of equalizer taps of the sets of equalizer taps to a second subset; and
determining a second covariance measure associated with the second plurality of equalizer taps of the second subset based on a second correlation criterion.

2. The method of claim 1, wherein the first correlation criterion is based on a temporal correlation and a spatial correlation.

3. The method of claim 1, wherein the second correlation criterion is based only on a spatial correlation.

4. The method of claim 1, wherein assigning the first plurality of equalizer taps is based on a first threshold value.

5. The method of claim 4, wherein time delays associated with the first plurality of equalizer taps of the first subset differ at most by the first threshold value.

6. The method of claim 5, wherein the first threshold value has a value of five chips.

7. The method of claim 1, wherein assigning the second plurality of equalizer taps is based on a second threshold value.

8. The method of claim 7, wherein time delays associated with the second plurality of equalizer taps of the second subset differ at least by the second threshold value.

9. The method of claim 8, wherein the second threshold value has a value of twenty chips.

10. The method of claim 1, wherein the first plurality of equalizer taps of the first subset are equidistantly spaced.

11. The method of claim 1, wherein the second plurality of equalizer taps of the second subset are non-equidistantly spaced.

12. A device, comprising:
a plurality of antenna ports configured to receive radio signals from a plurality of antennas;
a plurality of sets of equalizer taps configured to generate multi-path signals based on the received radio signals, wherein each set of the equalizer taps is coupled to a respective one of the plurality of antenna ports;
a first unit configured to assign a first plurality of equalizer taps of the sets of equalizer taps to a first subset and to assign a second plurality of equalizer taps of the sets of equalizer taps to a second subset; and
a second unit configured to determine a first covariance measure associated with the first plurality of equalizer taps of the first subset based on a first correlation criterion and to determine a second covariance measure associated with the second plurality of equalizer taps of the second subset based on a second correlation criterion.

13. The device of claim 12, wherein the first correlation criterion is based on a temporal correlation and a spatial correlation.

14. The device of claim 12, wherein the second correlation criterion is based only on a spatial correlation.

15. The device of claim 12, wherein time delays associated with the first plurality of equalizer taps of the first subset differ at most by a first threshold value.

16. The device of claim 12, wherein time delays associated with the second plurality of equalizer taps of the second subset differ at least by a second threshold value.

17. The device of claim 12, wherein the first plurality of equalizer taps of the first subset are placed at time delays differing from multi-path positions of the received radio signals.

18. The device of claim 12, wherein the first subset comprises a number of equalizer taps differing from a number of multi-path positions of the received radio signals.

19. The device of claim 12, wherein the second plurality of equalizer taps of the second subset are placed at time delays matching multi-path positions of the received radio signals.

20. The device of claim 12, wherein the second subset comprises a number of equalizer taps matching a number of multi-path positions of the received radio signals.

21. A method, comprising:
receiving signals at a plurality of sets of equalizer taps, wherein each set of the equalizer taps is coupled to a respective one of a plurality of antenna ports; and
determining data corresponding to a noise and interference covariance matrix based on the received signals, wherein a first part of the noise and interference covariance matrix comprises a first covariance measure associated with a first plurality of the equalizer taps of a first subset of the sets of equalizer taps,
wherein the first covariance measure is based on a first correlation criterion, and a second part of the noise and interference covariance matrix comprises a second covariance measure associated with a second plurality of the equalizer taps of a second subset of the sets of equalizer taps, wherein the second covariance measure is based on a second correlation criterion.

22. The method of claim 21, wherein the first correlation criterion is based on a temporal correlation and a spatial correlation, and the second correlation criterion is based only on a spatial correlation.

23. The method of claim 21, wherein the noise and interference covariance matrix is of dimension $(M \times K) \times (M \times K)$, wherein M denotes a number of the antenna ports and K denotes a number of equalizer taps per set of equalizer taps.

24. The method of claim 21, wherein the noise and interference covariance matrix is a block diagonal matrix.

25. The method of claim 21, wherein the first part of the noise and interference covariance matrix corresponds to at least one first diagonal block in the noise and interference covariance matrix; and
wherein the second part of the noise and interference covariance matrix corresponds to at least one second diagonal block in the noise and interference covariance matrix.

* * * * *